United States Patent [19]

Hans et al.

[11] Patent Number: 4,651,931

[45] Date of Patent: Mar. 24, 1987

[54] INJECTION VALVE

[75] Inventors: Waldemar Hans, Bamberg; Mathias Linssen, Litzendorf; Rudolf Sauer, Benningen, all of Fed. Rep. of Germany

[73] Assignee: Robert Bosch GmbH, Stuttgart, Fed. Rep. of Germany

[21] Appl. No.: 714,300

[22] Filed: Mar. 21, 1985

[30] Foreign Application Priority Data

May 19, 1984 [DE] Fed. Rep. of Germany ....... 3418761

[51] Int. Cl.[4] ..................... F02M 61/20; F02M 61/10; F02M 61/00; F16K 31/02

[52] U.S. Cl. ............................ 239/533.9; 239/533.11; 239/533.12; 239/585; 251/120; 251/129.21

[58] Field of Search ................ 239/585, 533.9, 533.11, 239/533.12; 251/129.21, 129.15, 120

[56] References Cited

U.S. PATENT DOCUMENTS

| | | | |
|---|---|---|---|
| 1,664,613 | 4/1928 | French | 251/129.21 |
| 2,332,909 | 10/1943 | Fuscaldo | 251/129.21 |
| 2,687,869 | 8/1954 | Kanuch | 251/120 |
| 3,892,362 | 7/1975 | Gayfer | 239/533.9 |
| 4,276,906 | 7/1981 | Eguchi | 251/120 |
| 4,331,317 | 5/1982 | Kamai et al. | 239/585 |

FOREIGN PATENT DOCUMENTS

| | | | |
|---|---|---|---|
| 1391330 | 4/1975 | United Kingdom | 239/533.9 |

*Primary Examiner*—Joseph F. Peters, Jr.
*Assistant Examiner*—Patrick N. Burkhart
*Attorney, Agent, or Firm*—Edwin E. Greigg

[57] ABSTRACT

An injection nozzle for fuel injection systems of internal combustion engines, the nozzle being arranged to inject fuel into the intake tube of the engine. The injection valve includes a valve housing of ferromagnetic material, in which a tubular connection element which functions as a core with which an armature is arranged to cooperate. Joined to the valve housing is a nozzle body having a valve seat with which a sealing section of a nozzle needle also arranged to cooperate. The nozzle needle is guided by guide sections in a guide bore of the nozzle body, and the guide section adjacent to the sealing section is provided with metering bores. By metering fuel upstream of the valve seat, the fuel metering operation is prevented from being impaired by deposits.

4 Claims, 4 Drawing Figures

INJECTION VALVE

BACKGROUND OF THE INVENTION

The invention is based on an injection valve as generally defined hereinafter. An injection valve is already known in which to avoid deposits at the metering cross sections, which are the result of combustion residues in the intake tube or residues from fuel evaporation and all oil which can cause a change in the metered fuel quantity, the metering cross sections are shifted to upstream of the sealing section and embodied as surfaces at a guide section of the nozzle needle. The disadvantage here is that when the metering cross sections are manufactured, the manufacturing tolerances of both the guide bore and the metering faces at the guide section must be taken into account.

OBJECT AND SUMMARY OF THE INVENTION

The injection valve according to the invention and having the characteristics revealed later herein has the advantage over the prior art that the formation of deposits in the area of the fuel metering location is avoided, and this nozzle design which incorporates the fuel metering locations as taught herein are easy to manufacture.

A particularly advantageous feature of the invention is the embodiment of the metering bores at an inclination to the guide bore, as a result of which the ejected fuel spray can be acted upon in terms of its shape and preparation, in particular by generating a swirl motion thereto.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
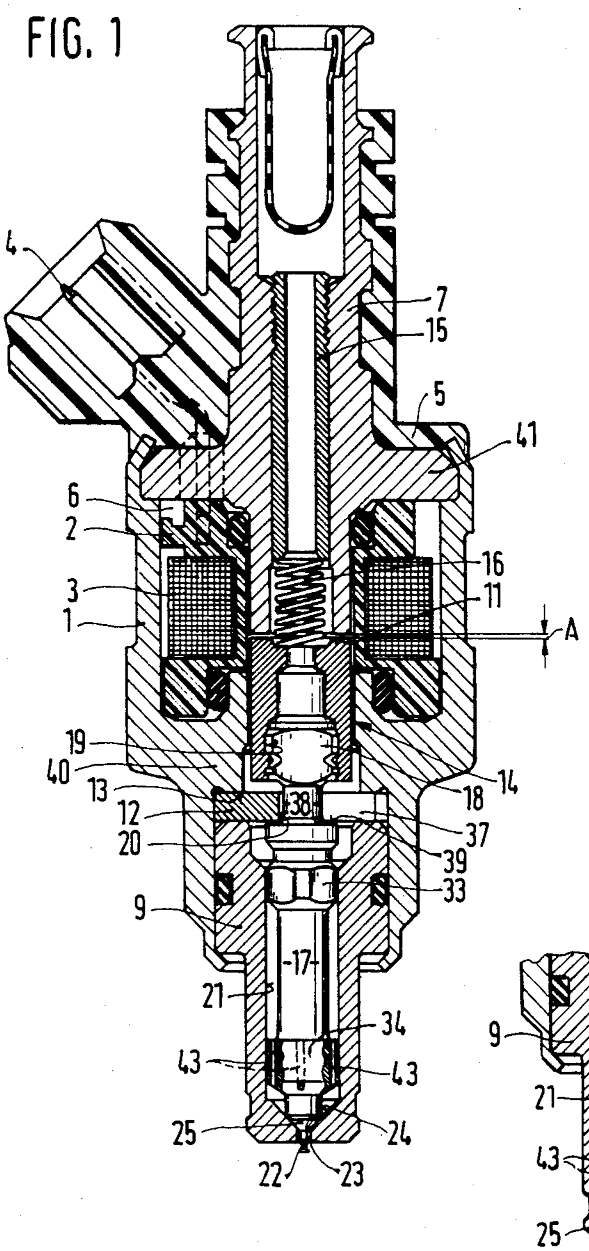
FIG. 1 shows a cross sectional view of a first exemplary embodiment of an injection valve according to the invention.

The fuel injection valve shown in FIG. 1 for a fuel injection system of a mixture-compressing internal combustion engine having externally supplied ignition has a valve housing 1 of ferromagnetic material, in which a magnetic coil 3 is disposed on a coil carrier 2. The magnetic coil 3 is supplied with electric current via a plug connection 4, which is embedded in a plastic ring 5 that partially surrounds the valve housing 1.

The coil carrier 2 of the magnetic coil 3 is seated in a coil chamber 6 of the valve housing 1 on a connection pipe 7 carrying the fuel, for instance gasoline, and the connection pipe 7 protrudes partway into the valve housing 1. Remote from the fuel pipe 7, the valve housing 1 partially surrounds a nozzle body 9.

The cylindrical armature 14 of the fuel injection valve is located between an end face 11 of the connection pipe 7 and a stop plate 12, which has a predetermined thickness for the purpose of precisely adjusting the valve and which is mounted upon an internal shoulder 13 of the valve housing 1. The armature 14 is made of corrosion-resistant magnetic material. A compression spring 16 acting upon the armature 14 is disposed between the armature 14 and a tube insert 15, the latter being secured in the connection pipe 7 by constricting the pipe 7. On the other end, a nozzle needle 17 is secured in the armature 14, being inserted into an armature bore 19 of the armature 14 with an annularly grooved end 18 and is retained therein by the armature material being pressed radially inward into the annular grooves of the annularly grooved end 18.

With radial play, the nozzle needle 17 penetrates through opening 20 in the stop plate 12 and a guide bore 21 in the nozzle body 9 and with the lower extremity of the needle 22 arranged to emerge from an injection opening 23 of the nozzle body 9. A conical valve seat face 24 which cooperates with a conical sealing section 25 on the nozzle needle 17 is formed between the guide bore 21 of the nozzle body 9 and the injection opening 23. The length of the nozzle needle 17 and of the armature 14 is dimensioned, beginning at the sealing section 25, such that in the nonexcited state of the magnetic coil 3 the armature 14 leaves a working gap A open with respect to the end face 11 of the tubular connection element 7.

The nozzle needle 17 has two guide sections 33 and 34, which guide the nozzle needle 17 in the guide bore 21 and also have an axial passageway for the fuel, to which end the guide section 33 located upstream of the guide section 34 is embodied as a rectangle, for instance.

Between the guide opening 20 and the circumference of the stop plate 12, a recess 37 is provided, the inside diameter of which recess is greater than the diameter of the nozzle needle in the corresponding region 38 of the nozzle needle 17, that is, it is greater diameter between the annularly grooved end 18 and the stop shoulder 39 of the nozzle needle 17. In the excited state of the magnetic coil 3, the armature 14 is moved in the opening direction of the nozzle needle 17 counter to the force of the compression spring 16 and rests with the stop shoulder 39 on the stop plate 12.

The magnetic flux is conducted through the jacket of the valve housing 1 via a magnetic flux conductor step 40 to the cylindrical armature 14 and from there back to the valve housing via the tubular connection element 7, which acts as a core and has a conductive flange 41. The magnetic flux conductor step 40 of the valve housing 1 points radially inward and surrounds the armature 14.

Figure 2:
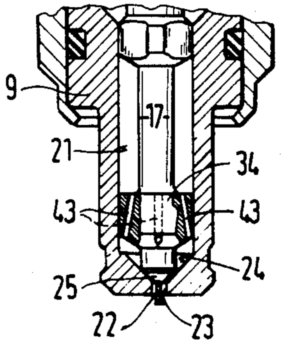
FIG. 2 shows a schematic detail in cross section of a second exemplary embodiment of an injection valve according to the invention.
Figure 3:
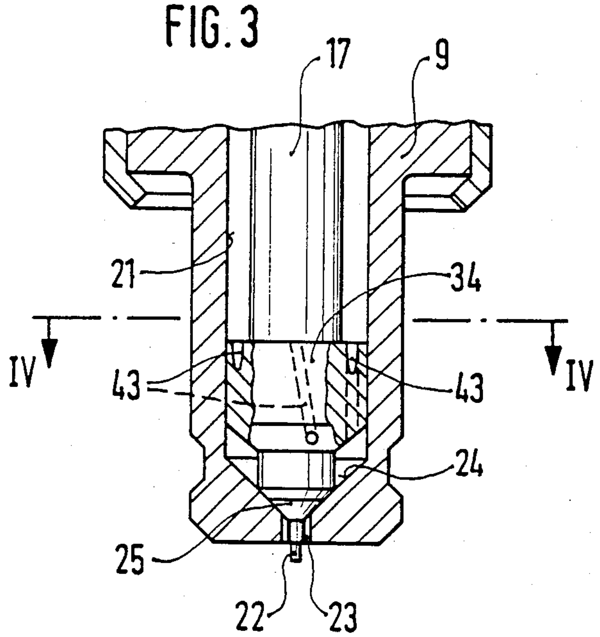
FIG. 3 is a partial cross sectional view illustrating the inclined angle of the bores.
Figure 4:
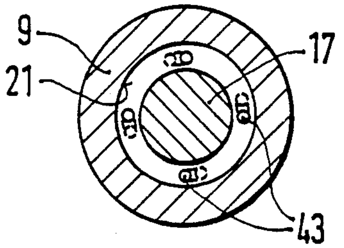
FIG. 4 is a cross sectional view of FIG. 3 which also shows the bores.

In accordance with the invention, metering bores 43, for instance four possibly in number, are cut into the cylindrically embodied guide section 34 adjacent to the sealing section 25 on the nozzle needle 17. By way of these bores 43, fuel can flow from upstream of the guide section 34 to downstream thereof whereupon a pressure drop of approximately 80 to 85% takes place, while the remaining pressure, which serves the purpose of fuel preparation, decreases between the injection opening 23 and the extremity of needle 22. The metering bores 43 are not opened in the radial direction with respect to the guide bore 21 and can extend either parallel to the guide bore 21 or, as shown in FIG. 2, inclined with respect thereto; these metering bores can additionally extend in such manner that the fuel which emerges from the metering bores 43 can be provided with a swirl or spin motion.

The metering bores 43 can be manufactured in a simple manner, unaffected by the manufacturing tolerances of the guide bore 21 and the guide section 34. By disposing the metering bores 43 upstream of the valve seat face 24, deposits in the metering bores 43 are avoided. Deposits in the relatively wide gap between the extremity of neddle 22 and the wall of the injection opening 23 have only a negligible effect on the metered fuel quantity.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An injection valve for fuel injection systems of internal combustion engines comprising a nozzle body having a valve seat and a nozzle needle, which has a sealing section arranged to cooperate with said valve seat, a guide section having a circumference upstream of said valve seat adapted to guide said nozzle needle in a guide bore, said guide section including metering bores adapted to meter fuel flow from upstream of said guide section to downstream of said guide section in which a pressure drop takes place in said metering bores in said guide section.

2. An injection valve as defined by claim 1, further wherein said metering bores extend in a plane parallel to said guide bore.

3. An injection valve as defined by claim 1, further wherein said metering bores extend at an inclined angle relative to said guide bore.

4. An injection valve as claimed in claim 3 wherein said metering bores extend at an inclined angle such that emerging fuel is directed into a swirl motion.

* * * * *